United States Patent
Gross

(10) Patent No.: US 8,924,697 B2
(45) Date of Patent: Dec. 30, 2014

(54) METHOD FOR PROCESSING INTERRUPT REQUESTS IN A PROCESSOR

(75) Inventor: Juergen Gross, Rosenheim (DE)

(73) Assignee: Fujitsu Siemens Computers GmbH, Munich (DE)

( * ) Notice: Subject to any disclaimer, the term of this patent is extended or adjusted under 35 U.S.C. 154(b) by 903 days.

(21) Appl. No.: 12/392,229

(22) Filed: Feb. 25, 2009

(65) Prior Publication Data

US 2009/0217019 A1   Aug. 27, 2009

(30) Foreign Application Priority Data

Feb. 25, 2008 (DE) .......................... 10 2008 010 943

(51) Int. Cl.
| | | |
|---|---|---|
| G06F 7/38 | (2006.01) | |
| G06F 9/00 | (2006.01) | |
| G06F 9/44 | (2006.01) | |
| G06F 15/00 | (2006.01) | |
| G06F 9/38 | (2006.01) | |
| G06F 9/46 | (2006.01) | |
| G06F 9/48 | (2006.01) | |

(52) U.S. Cl.
CPC ............ G06F 9/3851 (2013.01); G06F 9/3885 (2013.01); G06F 9/462 (2013.01); G06F 9/4812 (2013.01)
USPC ....................................................... 712/244

(58) Field of Classification Search
None
See application file for complete search history.

(56) References Cited

U.S. PATENT DOCUMENTS

| | | | |
|---|---|---|---|
| 5,515,538 A | 5/1996 | Kleiman | |
| 5,944,816 A | 8/1999 | Dutton et al. | |
| 6,061,710 A * | 5/2000 | Eickemeyer et al. | 718/107 |
| 7,082,519 B2 * | 7/2006 | Kelsey et al. | 712/228 |
| 7,376,954 B2 * | 5/2008 | Kissell | 718/107 |
| 7,418,585 B2 * | 8/2008 | Kissell | 712/244 |

FOREIGN PATENT DOCUMENTS

WO    WO 97/44732    11/1997

OTHER PUBLICATIONS

Birrell, A.D., "An Introduction to Programming with C# Threads," May 2005, 41 pages.
Java Threads, date unknown, 19 pages.
Kleiman S., et al., "Symmetric Multiprocessing in Solaris 2.0," 1992, pp. 181-186, IEEE.

* cited by examiner

*Primary Examiner* — Corey S Faherty
(74) *Attorney, Agent, or Firm* — Slater & Matsil, L.L.P.

(57) ABSTRACT

A method for processing interrupt requests in a processor is suitable for executing at least two threads in parallel, wherein an instruction pipeline is provided for each of the at least two threads. One of the at least two threads is defined as a main thread for processing programs. Another thread of the at least two threads is assigned to the main thread as an interrupt thread. After an interrupt request is received, the processor stores interrupt data in a register assigned to the interrupt thread. Subsequently, the processing of an interrupt routine is started in the interrupt thread and at least part of the interrupt routine is executed in the interrupt thread.

17 Claims, 4 Drawing Sheets

METHOD FOR PROCESSING INTERRUPT REQUESTS IN A PROCESSOR

This application claims priority to German Patent Application 10 2008 010 943.6, which was filed Feb. 25, 2008 and is incorporated herein by reference.

TECHNICAL FIELD

Embodiments of the invention pertain to a method for processing interrupt requests in a processor that can execute at least two threads in parallel.

BACKGROUND

A processor or CPU (Central Processing Unit) in a computer system controls the components of the system by means of software, usually the operating system. A processor generally includes registers, an arithmetic-logic unit, an instruction decoder that translates machine instructions into usable instructions and, if so required, breaks the machine instructions down into individual processing steps, as well as a control unit that controls the remaining components of the processor by setting suitable signals. In this case, a register is a memory for intermediate results (for example, of arithmetic operations) that can be very quickly accessed. It supplies a data path and the control unit with data without wait cycles in accordance with set signals.

In order to increase the power of a processor, so-called hyperthreading is frequently used in modern processors. Hyperthreading refers to the parallel processing of so-called threads (also referred to as execution threads), as well as of processes, by means of at least two logic processors that are realized on a common chip. In this context, a thread characterizes the execution sequence in which the software of the system is processed, and represents a sequential processing cycle of a processor.

The processors are referred to as logic processors because at least parts of the hardware are only provided once and jointly used by the processors. The size and number of the arithmetic-logic units usually remain unchanged. However, certain hardware components are provided redundantly. For example, an additional register set is made available in order to realize two logic processors on one chip. Also provided is a separate so-called Advanced Programmable Interrupt Controller (APIC) that accepts interrupt requests from devices in the system and other internal housekeeping structures. Both logic processors largely operate independently of one another such that the data throughput and the capacity utilization of the physical processor are increased and its resources can be better utilized.

The efficiency of individual threads is often significantly restricted by interruptions (also referred to as interrupts). So-called synchronous interrupts are brought about by the program itself that is currently being run. Synchronous interrupts do not change the sequence of instructions that are stored in an instruction pipeline of the thread and must be executed. Here, an instruction pipeline is a series of instructions that are successively processed in a thread. An example of a synchronous interrupt is missing address translation information (a so-called "TLB (Translation Lookaside Buffer) miss"). In addition, a number of other synchronous interrupts may occur due to the hardware or software, and triggered by the program code currently being processed.

In addition, asynchronous interrupts occur that may be unrelated to the current program such as messages from other processors (for example, during a power failure) or peripheral devices of the system, wherein the instructions to be executed that are stored in the instruction pipeline of the thread must be discarded in order to instead load and process instructions of a routine for processing the interrupt.

In this case, each interrupt usually leads to a type of thread state change that is equivalent to an interruption of the currently running process and the initiation of a program for processing the interrupt. In this case, the current context of the thread (register contents, address of the interrupt) must be stored in a main memory and thus secured. Subsequently, the processor must store data for processing the interrupt (for example, the address of a certain instruction or the access address for which the address entry is missing) in registers for the interrupt processing, i.e., a context for the actual processing of the interrupt must be loaded. This procedure requires much time and effort that frequently leads to the loss of several hundred processor cycles before the interrupted context can be retrieved from the memory again and resumed.

The instructions for processing the (interrupted) program in the instruction pipeline are discarded when an interrupt request occurs. The pipeline is subsequently filled with instructions required for processing the interrupt. After the interrupt has been processed, the instruction pipeline must again be cleared and filled in order to continue the previously interrupted program or to start a new program, wherein this once again requires much time and computing power.

SUMMARY

In various aspects, the invention describes a method for processing interrupt requests in a processor that can execute in parallel at least two threads that each have their own instruction pipeline, wherein the method makes it possible to shorten the interrupt time and therefore to increase the efficiency of individual threads and the processor.

In an embodiment of a method of the initially cited type, one of the at least two threads is defined as a main thread for processing a program. Another one of the at least two threads is assigned to the main thread as an interrupt thread. The main thread is started by the processor. After an interrupt request is received, interrupt data is stored in a register assigned to the interrupt thread. Subsequently, the processing of an interrupt routine in the interrupt thread is started and at least partially executed.

The method utilizes the fact that the efficiency of the main thread can be increased if the processing of interrupts is carried out by another thread that is assigned to the main thread, namely the interrupt thread. Consequently, the main thread remains largely unaffected by the interrupt processing. In contrast to the known processing of the interrupt routine in the main thread, it is not necessary to discard the contents of the instruction pipeline of the main thread in embodiments of the invention. This eliminates the time-consuming reloading of the instruction pipeline after the interrupt has been processed.

In one preferred embodiment of the invention, the processing of the program in the main thread is stopped by the processor and resumed after executing at least part of the interrupt routine in the interrupt thread. The method therefore can also be utilized in instances in which it is necessary to interrupt the program while the interrupt routine is executed.

In another preferred embodiment of the invention, the additional processing of the program in the main thread is restarted by a signal that is sent from the interrupt thread to the main thread.

In another preferred embodiment of the invention, the processing of the program in the main thread is stopped by the interrupt thread after at least part of the interrupt routine has been executed in the interrupt thread, and the interrupt routine subsequently continues in the main thread. After the completion of the interrupt routine in the main thread, the processing of the program in the main thread resumes. This makes it possible to also take into account instances in which the interrupt routine should be partially executed in the main thread. However, the program and the interrupt routine advantageously can be executed simultaneously, at least intermittently.

According to another embodiment of the invention, the interrupt processing in the interrupt thread is pre-initialized by the processor by loading register values required for the interrupt processing in a register assigned to the interrupt thread. This eliminates the loading of the register values at the time an interrupt request occurs, and the execution of an interrupt routine in the interrupt thread can be started sooner.

According to other embodiments of the invention, the interrupt thread is transferred into a sleep mode by the processor after the pre-initialization of the interrupt thread or after the processing of interrupts and, if applicable, after executing interrupt post-processing.

According to another embodiment, the interrupt thread is not activated by the processor until an interrupt request occurs.

Other details and embodiments of the inventive method are disclosed in the dependent claims.

BRIEF DESCRIPTION OF THE DRAWINGS

The invention is described in greater detail below with reference to embodiment examples that are illustrated in the drawings.

In the drawings.

DETAILED DESCRIPTION OF ILLUSTRATIVE EMBODIMENTS

Figure 4:
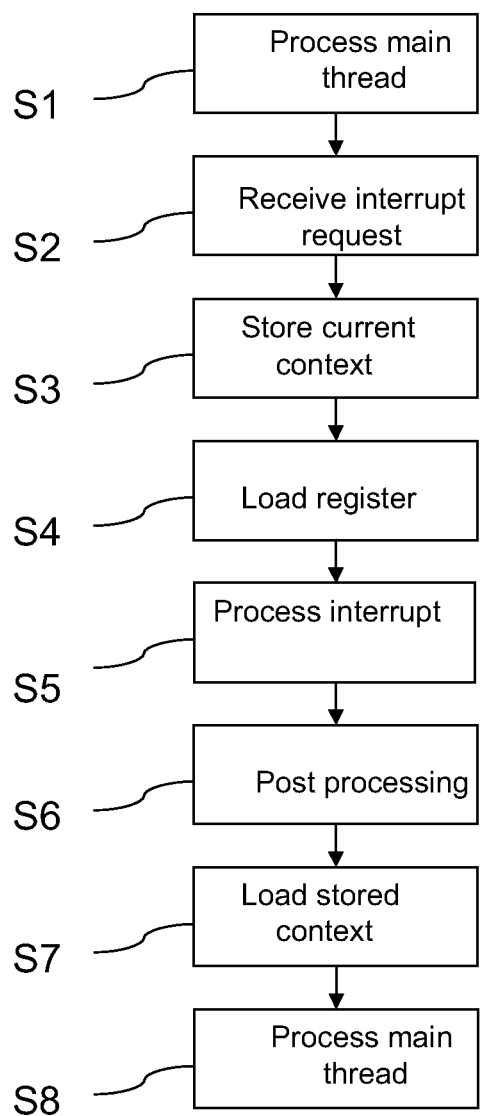
FIG. 4 shows a flow chart of a method for processing interrupt requests in a processor in accordance with the state of the art.

FIG. 4 shows a flow chart for processing interrupt requests in a processor in accordance with the state of the art. The processor may be designed for hyperthreading such that several threads can be processed in parallel.

Step S1 describes the processing of instructions of an instruction pipeline for executing a program in a thread.

In step S2, an interrupt requests occurs due to a synchronous or asynchronous interrupt and leads to the interruption of the program currently being executed in the thread.

A current (interrupted) context of the thread is subsequently secured (step S3) by storing corresponding register contents and also the address of the interrupt in a main memory. Unfortunately, this process is very time-consuming. The instructions in the instruction pipeline must be deleted and instructions for processing a program for processing the interrupt must be loaded.

Subsequently, a new context for processing the interrupt must be prepared by loading corresponding registers (step S4). In special processors, in which a separate register set is reserved for the interrupt processing, the loading of the registers can be partially eliminated.

In step S5, an interrupt routine is executed in the thread, and the post-processing of the interrupt is carried out in step S6. In this case, the post-processing may include keeping access statistics or filling a TLB software cache.

Once the interrupt processing is completed, the previously interrupted context must be reactivated by reloading the stored registers from the memory (step S7). Furthermore, the instruction pipeline must be reloaded with instructions for the (additional) processing of the current program.

Subsequently, the thread once again begins to process the instructions in the instruction pipeline and the previously interrupted program is resumed or a new program is executed (step S8).

Due to the fact that the interrupted context must be initially stored and subsequently reloaded from the memory and the context relevant to the interrupt processing must also be loaded, the processing of the interrupt requires much time and computing power. In addition, in the method according to the state of the art, since one instruction pipeline is used for executing the current program as well as the interrupt processing, the instruction pipeline must be flushed several times and reloaded.

An interrupt that can be processed with relative ease therefore can require several hundred processor cycles before the processing of the current program can resume or a program change is executed in order to start a new program. Consequently, a method is described below that makes it possible to shorten the interrupt time and therefore to increase the efficiency of a thread and a processor.

Figure 1:
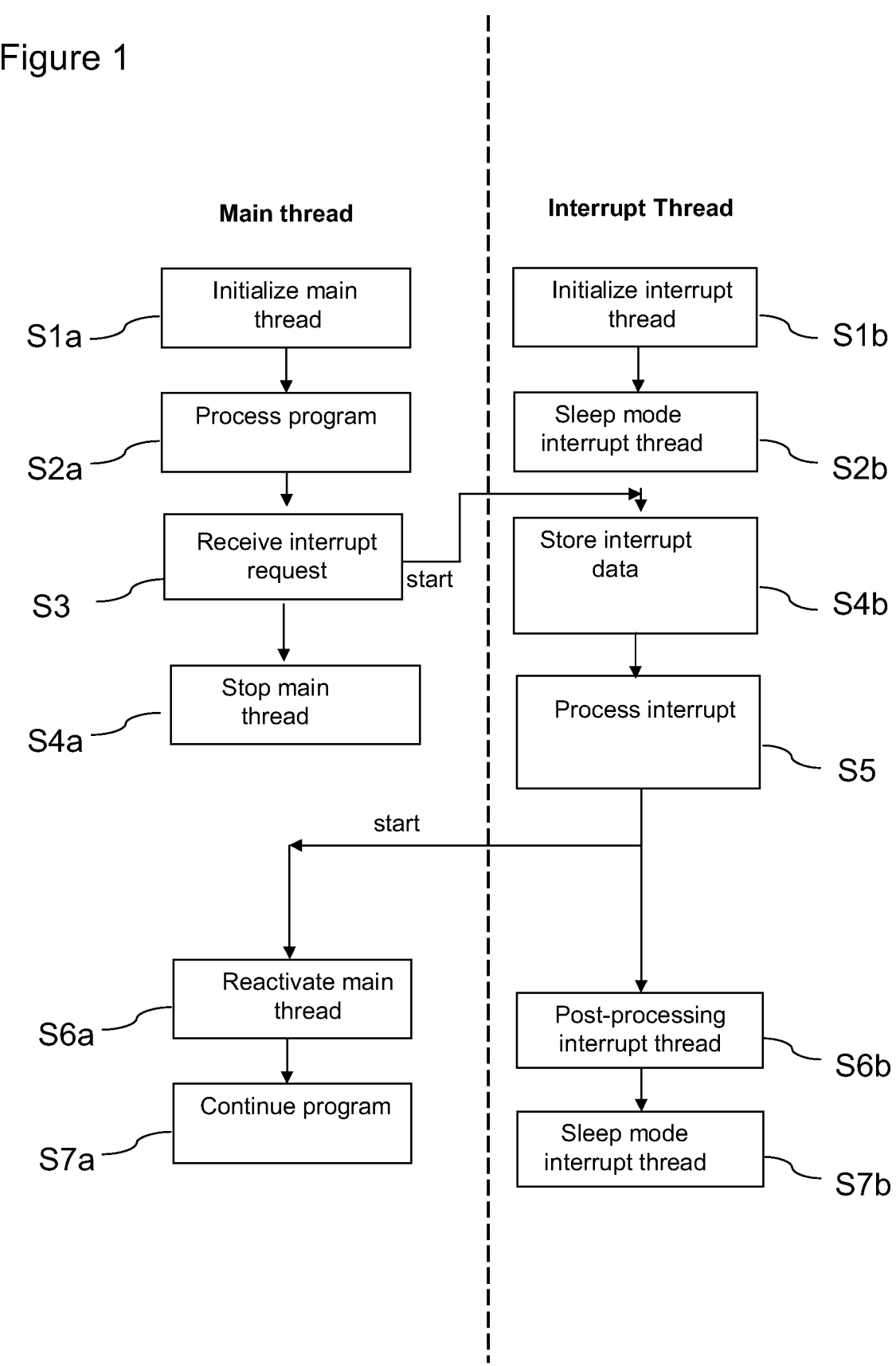
FIG. 1 shows a flow chart of a method for processing interrupt requests in a processor that is suitable for executing at least two threads in parallel.

FIG. 1 shows a flow chart for a method for processing interrupt requests in a processor that is suitable for executing at least two threads in parallel, wherein each thread features a separate instruction pipeline.

In steps S1a and S1b, a main thread and an interrupt thread are initialized by the processor by filling the registers of the threads with data for processing certain programs and routines that are predefined in corresponding routines of an operating system. Here, the processor receives commands with initialization instructions, as well as the information and data to be stored in the registers, from the operating system that is correspondingly adapted to the processing of interrupts in accordance with the method. The processor executes the commands in accordance with the operating system and thus starts the initialization of the threads.

This may take place independently for the two threads. A register assigned to the interrupt thread may be filled, for example, with data for executing interrupt routines that is predefined in the operating system and thus pre-initialized for the interrupt processing. The operating system may feature different definitions for processing the different possible interrupts (synchronous, asynchronous). Due to the loading of the interrupt routine data, it is no longer necessary to load register values suitable for the interrupt processing when an interrupt request occurs, so an interrupt routine can be started sooner and the processing of the interrupt also requires less time.

In step S2a, the main thread, activated by the processor, takes over the processing of instructions in the instruction pipeline and thus begins the processing of the program.

The main thread and the interrupt thread each feature their own instruction pipeline. Since one instruction pipeline is provided for each of the main thread and the interrupt thread, it is no longer necessary to delete the instruction pipeline, to subsequently fill the instruction pipeline with instructions required for the interrupt processing and to once again delete and fill the instruction pipeline with the instructions required for resuming the program to be processed by the main thread after the interrupt processing if an interrupt occurs. This makes it possible to save time and computing power, and the interrupt time can be shortened.

After the initialization, the interrupt thread is transferred (parallel to step S2a) into a type of sleep mode or standby mode by the processor (step S2b) that executes a corresponding instruction from the operating system and forwards this instruction to the interrupt thread so that it is transferred into a power-saving mode.

An interrupt request occurs in step S3. The reason for this interrupt request may be a synchronous interrupt caused by the processor itself, for example, triggered due to missing address translation information, or an asynchronous interrupt caused by peripheral devices or other processors.

In step S4a, the main thread is stopped by the processor that executes corresponding instructions of the operating system, in which it is defined that the executed interrupt routine should stop the main thread. In this case, the current context of the main thread, as well as the corresponding instruction pipeline that was stopped when the main thread was stopped, are preserved. Due to the stop, the main thread is merely in a type of "standby mode," but essentially remains unaffected by the interrupt processing itself.

In step S4b, a start instruction (that is once again triggered by predefined adjustments in the operating system) is sent from the processor to the interrupt thread such that it wakes up from the sleep mode. The processor stores interrupt data, for example, the address of the interrupt, in a register assigned to the interrupt thread. In this case, independent registers may be assigned to the interrupt thread and the main thread in order to ensure that one respective register is available for the interrupt processing (in the interrupt thread) and for the execution of the current program (in the main thread).

In step S5, the interrupt thread begins with the processing of the interrupt routine while the main thread stays in a "standby mode" (see step S4a).

The main thread is once again reactivated (step S6a) by the interrupt thread while the interrupt processing, i.e., the processing of the interrupt routine, continues to take place in the interrupt thread. This may be realized, for example, at a very specific point of the interrupt routine, for example, after the actual interrupt routine is already completed, but certain post-processing still must be carried out. At this point, the interrupt thread may send a signal to the main thread so that it is reactivated.

In step S6b, the interrupt thread carries out interrupt post-processing while the main thread, reactivated by a corresponding signal from the interrupt thread (see step S6a), has already started the continued processing of the previously executed program (step S7a). The interrupt time can be additionally shortened and the efficiency of the main thread (and of the processor) can be additionally increased due to this brief parallel operation of the two threads while the interrupt post-processing is still being carried out.

After the post-processing, the interrupt thread is transferred back into the sleep mode in step S7b by the processor that has received corresponding instructions from the operating system. The main thread and the interrupt thread therefore only operate in parallel for a brief period of time (step S6 and step S7).

Figure 2:
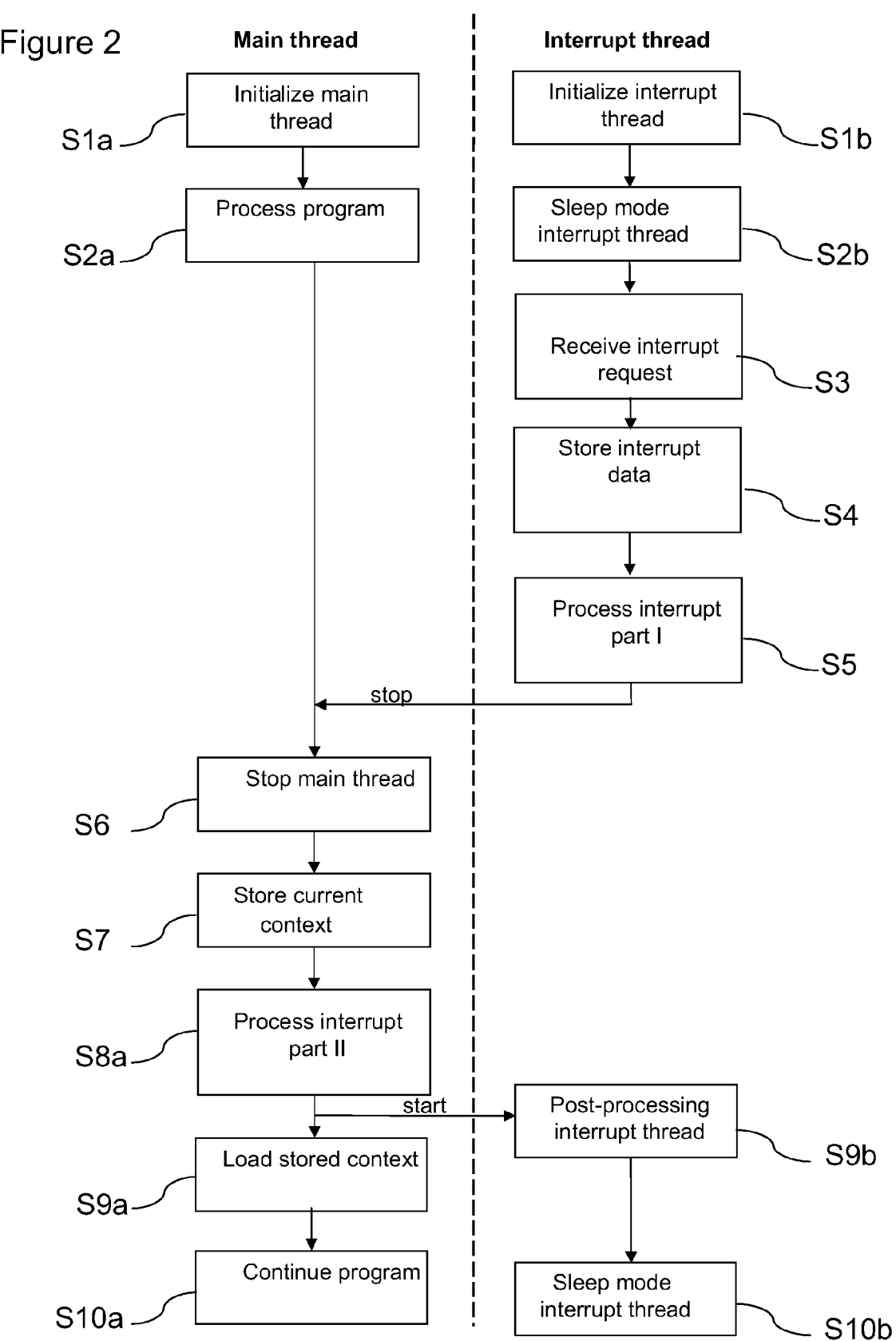
FIG. 2 shows a flow chart of another embodiment example of a method for processing interrupt requests in a processor that is suitable for executing at least two threads in parallel.

FIG. 2 shows a flow chart for a method for processing interrupt requests in a processor that is suitable for executing at least two threads in parallel, wherein each thread features a separate instruction pipeline. This embodiment of the invention is particularly suitable for processing asynchronous interrupts that are not triggered by the processor itself.

In steps S1a and S1b, the main thread and the interrupt thread are once again initialized by the processor (see FIG. 1, steps S1a/b) that executes the instructions of an adapted operating system and stores information for the interrupt processing or for the execution of programs that is predefined by the operating system in the registers assigned to the respective thread. The register of the interrupt thread can here be refilled with data of an interrupt routine and thus pre-initialized for the processing of interrupts.

In step S2a, the main thread begins to process the instructions from the instruction pipeline that belongs to the main thread, wherein the interrupt thread is transferred into sleep mode by the processor in step S2b (for details, see FIG. 1).

Step S3 represents an interrupt request that is caused by an asynchronous interrupt. In this variation, the processor directly routes the interrupt request to the interrupt thread, due to corresponding definitions in the operating system, rather than to the main thread, as illustrated in FIG. 1.

Subsequently, the processor stores interrupt data in a register assigned to the interrupt thread (step S4).

In step S5, the interrupt thread begins with the execution of the interrupt routine, due to an instruction of the operating system that was executed by the processor. During this time, the main thread continues to operate and therefore remains completely unaffected by the interrupt.

After part of the interrupt processing has been executed by the interrupt thread—for example, up to the point at which the program being processed by the main thread must be stopped and a new program must be executed in order to process the interrupt—a stop signal is sent from the interrupt thread to the main thread so that the main thread and its instruction pipeline are stopped (step S6).

In step S7, the current context of the main thread is subsequently secured by storing the corresponding information in a main memory. This makes it possible to resume the interrupted program from the same point at a later time. The instruction pipeline is flushed and filled with instructions relevant to the interrupt processing.

In step S8a, the additional interrupt processing is resumed by the main thread that begins to execute a program required for the interrupt processing. This makes it necessary to load a context relevant to the new program that was already prepared by the interrupt thread and can be forwarded to the main thread. The loading time can be shortened and the interrupt time can be reduced due to the preparation of information relevant to the new program (required for the interrupt processing) by the interrupt thread.

After the interrupt processing by the main thread, the secured context (see step S7) of the previously interrupted program is reloaded as illustrated in step S9a.

Furthermore, information relevant to interrupt post-processing is forwarded from the main thread to the interrupt thread parallel to step S9a, wherein the interrupt thread subsequently begins with the interrupt post-processing (step S9b). The information relevant to the post-processing may contain access statistics or data of TLB software that must be filled into a corresponding cache during the post-processing. The duration of the interrupt can be additionally shortened and the efficiency of the processor can therefore be increased due to the fact that the post-processing is carried out by the interrupt thread.

After the context of the interrupted program has been reloaded (step S9a), the main thread begins with the additional processing of the program executed prior to the interrupt processing (step S10a). At this time, the interrupt thread may still be occupied with the interrupt post-processing (see step S9b).

Once the interrupt thread has completed the interrupt post-processing, it is once again transferred into the sleep mode by the processor (step S10b) due to a corresponding instruction of the operating system.

In this embodiment, part of the interrupt routine may already be processed in the interrupt thread (step S5) in order to shorten an interruption of the currently executed program (during the additional interrupt processing in the main thread). The loading time for the new context required for the problem processing can be shortened and the interrupt time can be additionally reduced due to the fact that information on the interrupt is already collected in the interrupt thread and forwarded to the main thread. After the interrupt processing in the main thread, any required post-processing can be transferred to the interrupt thread so that the additional processing of the previously interrupted program can begin sooner. Consequently, the efficiency of the processor during interrupts is improved.

Figure 3:
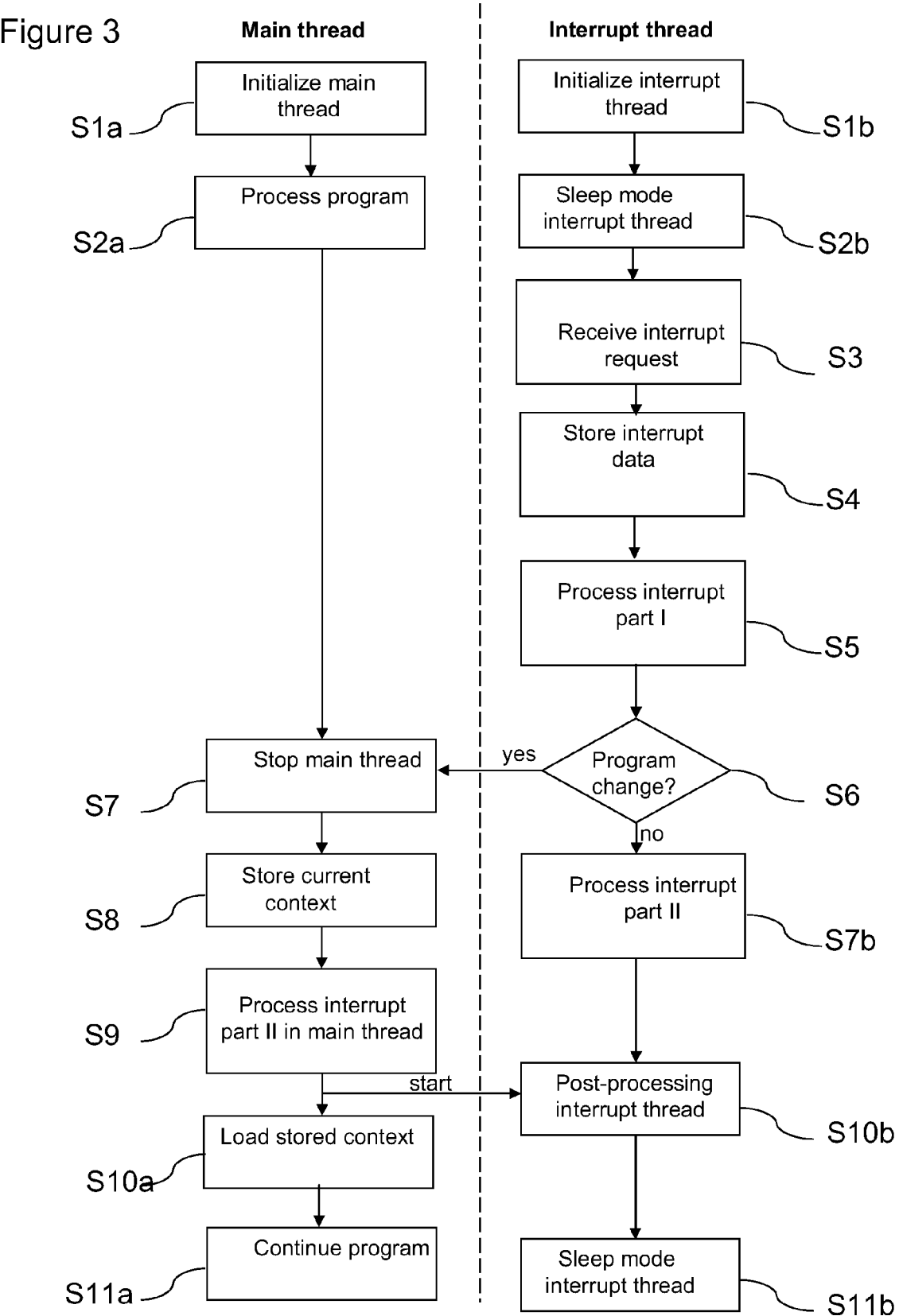
FIG. 3 shows a flow chart of a third embodiment example of a method for processing interrupt requests in a processor that is suitable for executing at least two threads in parallel.

FIG. 3 shows a flow chart for a third embodiment example of a method for processing interrupt requests in a processor that is suitable for executing at least two threads in parallel, where each thread features a separate instruction pipeline. This embodiment example is also particularly suitable for processing asynchronous interrupts, analogous to the embodiment of the invention illustrated in FIG. 2.

The embodiment example illustrated in FIG. 3 is identical to the embodiment of the invention shown in FIG. 2 up to and including step S5. With respect to a detailed description of the steps S1 to S5, we therefore refer to the description of FIG. 2 at this point.

In step S5, an interrupt routine is executed in the interrupt thread in order to process the interrupt. An inquiry (step S6) for checking whether the interrupt processing affects the main thread may be provided at a predetermined point of the interrupt processing. The question of whether the interrupt affects the main thread can be predefined in the interrupt routine being executed.

If the interrupt processing affects the main thread, for example, in that the program currently processed by the main thread can no longer be continued due to the interrupt processing and therefore must be interrupted and a new program (for the interrupt processing) must be loaded, the steps from step S7 up to and including step S11a are carried out (see corresponding steps S6 to S10a, FIG. 2). In other words, the main thread is stopped by a signal of the interrupt thread (step S7), the program currently being executed is thereby interrupted, the context of the main thread is secured (step S8) and the interrupt processing is continued in the main thread after loading a new context relevant to the interrupt processing (step S9). After the interrupt processing is completed, the previously interrupted context is reloaded (step S10a) and the program interrupted by the interrupt processing is additionally processed in the main thread (step S11a). The interrupt post-processing is once again carried out in the interrupt thread (step S10b), and initiated by corresponding signals of the main thread, and the interrupt thread is transferred into sleep mode after post-processing is completed (step S11b). With respect to a detailed explanation of these individual steps, reference is again made to FIG. 2 (steps S6 to S10).

If the interrupt processing does not affect the main thread, i.e., if the answer to the inquiry in step S6 is negative, the interrupt processing is continued in the interrupt thread in this embodiment example as illustrated in step S7b. In this case, the main thread can process the current program without having to be stopped, i.e., it is not influenced by the interrupt processing. Consequently, steps S7 to S9a, as well as steps S10a and S11a, are eliminated in this case, and the main thread continues with the processing of a program illustrated in step S2a in this embodiment example. The interrupt request and the processing of the interrupt therefore do not cause any delay in the operating sequence of the main thread.

After the interrupt processing was carried out in the interrupt thread and the corresponding post-processing (step S10b) is completed, the interrupt thread is also transferred into sleep mode in this embodiment example due to a corresponding instruction from the operating system as illustrated in step S11b.

In this embodiment example, signal transmission and exchange of information between the main thread and the interrupt thread are not required in order to start the post-processing (step S10b) because all information relevant to the interrupt post-processing is already contained in the interrupt thread due to the complete interrupt processing (step S5 and step S7b) in the interrupt thread.

This embodiment example provides the advantage that it can be initially checked whether the main thread must be incorporated into the interrupt processing when a synchronous interrupt occurs that can frequently lead to a program change, i.e., it can be checked whether the program currently being executed actually must be interrupted and a new program for the interrupt processing must be initialized, or the interrupt processing can be carried out in the interrupt thread only.

The main thread can continue processing the current program during this time. The main thread is only stopped by the interrupt thread and the current context is only stored if a program change is unavoidable, wherein information for starting a new program was already prepared by the interrupt thread such that the program change or the loading of the new context can be quickly realized and the time of the interrupt can be shortened. This makes it possible to increase the efficiency during the interrupt processing.

What is claimed is:

1. A method for processing interrupt requests in a hyperthreading processor that is suitable for executing at least two threads in parallel using at least two logic processors that are realized on a common chip, the at least two logic processors jointly use at least part of hardware provided by the common chip, the hyperthreading processor comprising at least a first register set provided in the hardware on the common chip and an additional register set provided in the hardware on the common chip, wherein an instruction pipeline is provided for each of the at least two threads, the method comprising:

defining one of the at least two threads as a main thread for processing a program;

assigning another thread of the at least two threads as an interrupt thread to the main thread, wherein independent registers provided in hardware are assigned to the at least two threads for supplying data without wait cycles to the respective threads;

starting the main thread by the hyperthreading processor by processing instructions from an instruction pipeline corresponding to the main thread;

receiving an interrupt request;

storing interrupt data in a register of the additional register set assigned to the interrupt thread by the hyperthreading processor;

after the interrupt request is received, placing the main thread in standby mode, wherein processing of the main thread is stopped and a current context of the main thread, including the corresponding instruction pipeline, is preserved;

starting the processing of an interrupt routine in the interrupt thread;

executing a part of the interrupt routine in the interrupt thread while the main thread is in the standby mode;

transmitting a signal from the interrupt thread to the main thread after the part of the interrupt routine has been executed in the interrupt thread;

resuming processing the program in the main thread after the signal from the interrupt thread has been transmitted to the main thread; and carrying out interrupt post-processing in the interrupt thread in parallel to the processing of the program in the main thread.

2. A method for processing interrupt requests in a processor that is suitable for executing at least two threads in parallel, wherein an instruction pipeline is provided for each of the at least two threads, the method comprising:

defining one of the at least two threads as a main thread for processing a program;

assigning another thread of the at least two threads as an interrupt thread;

starting the main thread by the processor;

receiving an interrupt request;

storing interrupt data in a register assigned to the interrupt thread by the processor;

starting the processing of an interrupt routine in the interrupt thread; and executing at least part of the interrupt routine in the interrupt thread;

wherein processing the program in the main thread is stopped after the interrupt thread has executed at least part of the interrupt routine in the interrupt thread;

wherein the interrupt routine continues in the main thread; and wherein processing the program in the main thread is resumed after the interrupt routine in the main thread is completed.

3. The method according to claim 2, further comprising:

deleting the instruction pipeline of the main thread and securing a current context of the main thread after the main thread has been stopped by the interrupt thread; and loading a new context for the interrupt processing into the main thread after securing the current context.

4. The method according to claim 3, further comprising preparing information for loading a context for interrupt processing in the interrupt thread and forwarding the information to the main thread.

5. The method according to claim 3, wherein the main thread is restarted after loading the new context in order to continue the interrupt routine by means of the interrupt thread and the processor.

6. The method according to claim 2, further comprising carrying out interrupt post-processing in the interrupt thread.

7. The method according to claim 6, further comprising forwarding information for the interrupt post-processing from the main thread to the interrupt thread after the interrupt routine is completed in the main thread.

8. The method according to claim 1, further comprising pre-initializing the interrupt routine by the hyperthreading processor in the interrupt thread by loading register values required for processing the interrupt into a register assigned to the interrupt thread.

9. The method according to claim 8, further comprising transferring the interrupt thread into a sleep mode by the hyperthreading processor after the pre-initialization.

10. The method according to claim 9, wherein the interrupt thread is not activated by the hyperthreading processor until an interrupt request occurs.

11. The method according to claim 1, further comprising transferring the interrupt thread into a sleep mode by the hyperthreading processor after processing the interrupt.

12. The method according to claim 11, wherein the interrupt thread is transferred into the sleep mode after carrying out the interrupt post-processing.

13. The method according to claim 11, wherein the interrupt thread is not activated by the hyperthreading processor until another interrupt request occurs.

14. A method for processing interrupt requests in a hyperthreading processor that is suitable for executing at least two threads in parallel using at least two logic processors that are realized on a common chip, the at least two logic processors jointly use at least part of hardware provided by the common chip, the hyperthreading processor comprising at least a first register set provided in the hardware on the common chip and an additional register set provided in the hardware on the common chip, wherein an instruction pipeline is provided for each of the at least two threads, the method comprising:

defining one of the at least two threads as a main thread for processing a program;

assigning another thread of the at least two threads as an interrupt thread to the main thread, wherein independent registers provided in hardware are assigned to the at least two threads for supplying data without wait cycles to the respective threads;

starting the main thread by the hyperthreading processor by processing instructions from an instruction pipeline corresponding to the main thread;

pre-initializing the interrupt routine by the hyperthreading processor in the interrupt thread by loading register values required for processing the interrupt into a register assigned to the interrupt thread;

transferring the interrupt thread into a sleep mode by the hyperthreading processor after the pre-initialization, wherein the interrupt thread is not activated by the hyperthreading processor until an interrupt request occurs;

receiving an interrupt request;

storing interrupt data in a register of the additional register set assigned to the interrupt thread by the hyperthreading processor;

after the interrupt is received, placing the main thread in a standby mode, wherein processing of the main thread is stopped and a current context of the main thread, including the corresponding instruction pipeline, is preserved;

after the interrupt is received, activating the interrupt thread and starting the processing of an interrupt routine in the interrupt thread;

executing at least part of the interrupt routine in the interrupt thread while the main thread is in the standby mode; and resuming processing the program in the main thread after executing at least part of the interrupt routine in the interrupt thread.

15. The method according to claim 14, further comprising transferring the interrupt thread back into the sleep mode by the hyperthreading processor after processing the interrupt.

16. The method according to claim 15, wherein the interrupt thread is transferred into the sleep mode after carrying out interrupt post-processing.

17. The method according to claim 16, wherein processing the program in the main thread is resumed by transmitting a signal from the interrupt thread to the main thread after executing a part of the interrupt routine and before the interrupt post-processing is carried out.

\* \* \* \* \*